(12) United States Patent
Takamuku et al.

(10) Patent No.: US 11,799,111 B2
(45) Date of Patent: Oct. 24, 2023

(54) BATTERY AND MEMBRANE ELECTRODE ASSEMBLY

(71) Applicant: Robert Bosch GmbH, Stuttgart (DE)

(72) Inventors: Shogo Takamuku, Shibuya-ku-Tokyo (JP); Shinichi Makino, Shibuya-ku-Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/636,111

(22) PCT Filed: Aug. 14, 2020

(86) PCT No.: PCT/IB2020/057664
§ 371 (c)(1),
(2) Date: Feb. 17, 2022

(87) PCT Pub. No.: WO2021/033102
PCT Pub. Date: Feb. 25, 2021

(65) Prior Publication Data
US 2022/0293987 A1 Sep. 15, 2022

(30) Foreign Application Priority Data
Aug. 19, 2019 (JP) ................. 2019-149683

(51) Int. Cl.
*H01M 8/1004* (2016.01)
*H01M 4/86* (2006.01)
*H01M 8/1041* (2016.01)

(52) U.S. Cl.
CPC ....... *H01M 8/1004* (2013.01); *H01M 4/8657* (2013.01); *H01M 8/1041* (2013.01)

(58) Field of Classification Search
CPC ............. H01M 8/1004; H01M 4/8657; H01M 8/1041; H01M 8/102
See application file for complete search history.

(56) References Cited

FOREIGN PATENT DOCUMENTS

| | | |
|---|---|---|
| CN | 107652381 A | 2/2018 |
| JP | 2006155924 A | 6/2006 |
| JP | 2009004102 A | 1/2009 |
| JP | 2009064777 A | 3/2009 |
| JP | 2010067602 A | 3/2010 |
| JP | 2011021176 A | 2/2011 |
| JP | 2012099393 A | 5/2012 |
| JP | 2014010971 A | 1/2014 |
| WO | 2009116630 A1 | 9/2009 |
| WO | 2010044436 A1 | 4/2010 |
| WO | 2011114949 A1 | 9/2011 |

OTHER PUBLICATIONS

International Search Report and Written Opinion for Application No. PCT/IB2020/057664 dated Oct. 19, 2020 (8 pages).

*Primary Examiner* — Helen Oi K Conley
(74) *Attorney, Agent, or Firm* — Michael Best & Friedrich LLP

(57) ABSTRACT

To provide a battery or a membrane electrode assembly having high durability.
A battery (100) having a multilayer structure containing layers of a pair of electrodes (1), the battery (100) including a reinforcing material (20) provided in one or more layers or between layers.

12 Claims, 2 Drawing Sheets

[FIG. 1]
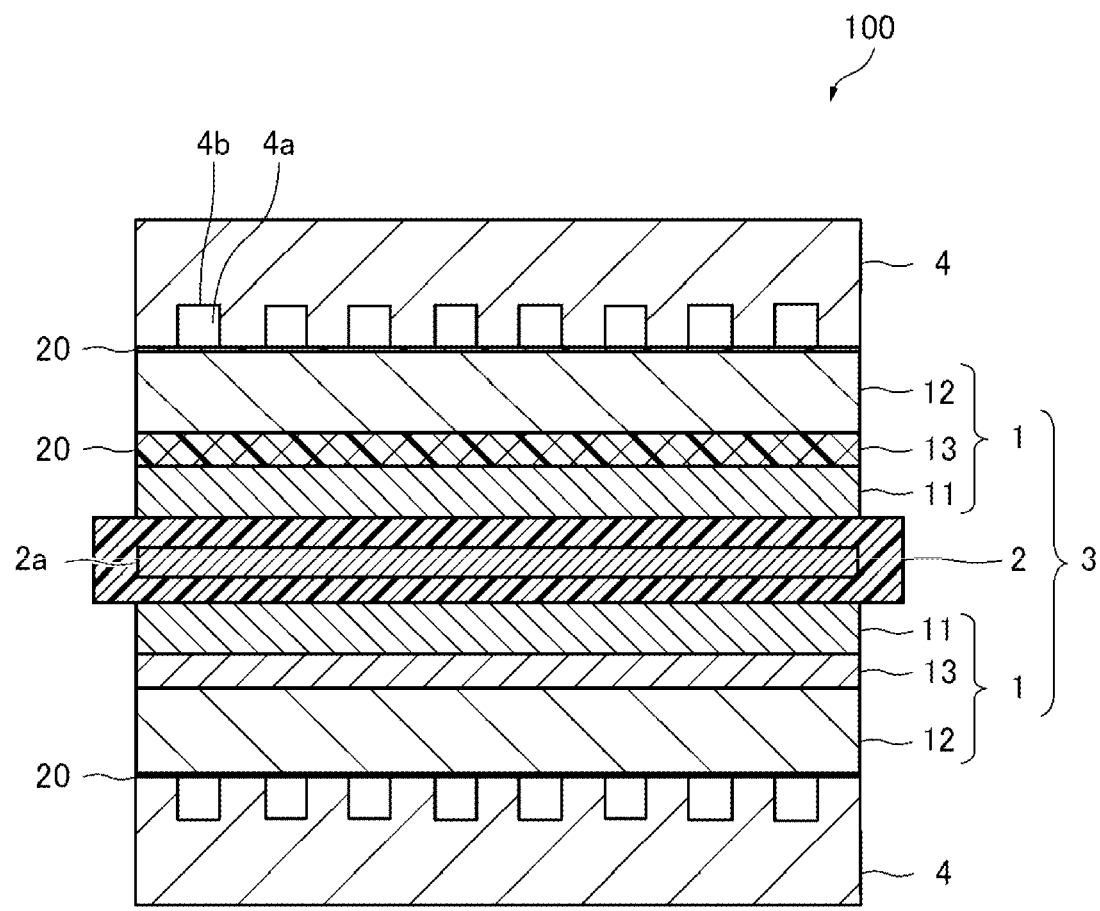

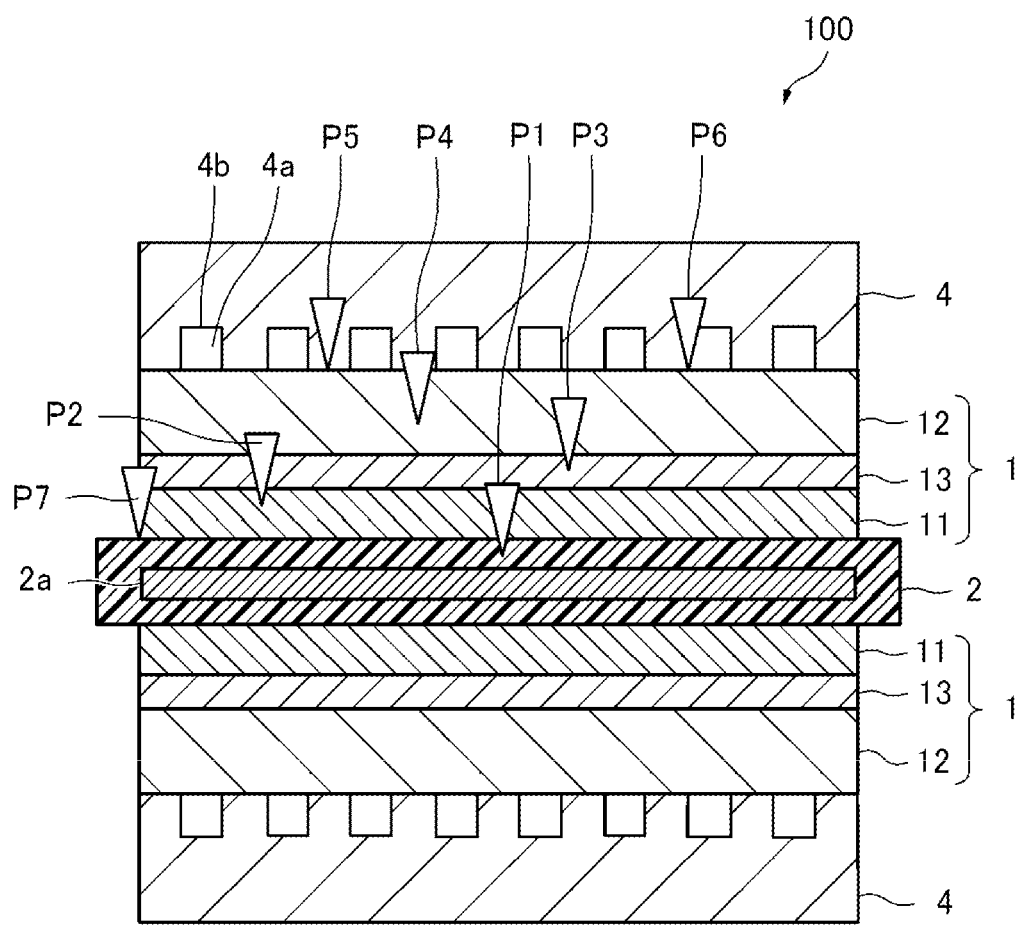
[FIG. 2]

BATTERY AND MEMBRANE ELECTRODE ASSEMBLY

BACKGROUND OF THE INVENTION

The present invention relates to a battery and a membrane electrode assembly.

Conventionally, chemical batteries such as lithium ion batteries and polymer electrolyte fuel cells (PEFC) have been used as batteries for supplying electric power to vehicles. Chemical batteries usually have a laminated structure. For example, the PEFC is a laminate having a configuration in which separators are laminated on both sides of a membrane electrode assembly, and the membrane electrode assembly is also provided with an electrolyte membrane of a solid polymer between a pair of electrodes. The electrode is also often composed of a plurality of layers such as a catalyst layer and a gas diffusion layer.

The electrolyte membrane is desired to be thin in order to reduce the resistance, but if it is too thin, pinholes or membrane breakages may occur. Therefore, research and development of an electrolyte membrane having excellent mechanical strength has been conducted (for example, see WO 2010/044436 and JP 2011-21176 A).

SUMMARY OF THE INVENTION

However, in order to increase the durability of the entire battery having a laminated structure, mechanical strength is desired not only for the electrolyte membrane. In particular, a battery mounted to a vehicle is likely to change in environmental conditions and is required to have high durability. For example, a heating and cooling cycle is repeated by a temperature change, and a wetting and drying cycle is repeated by a humidity change. In addition, a cycle of pressurization and depressurization for each layer is repeated due to a change in atmospheric pressure, an impact during traveling, or the like.

During this time, each layer of the battery repeats expansion and contraction, and breakage such as cracking may occur. Further, due to a difference in physical properties such as a thermal expansion coefficient and a tensile strength of a material used for each layer of the battery, breakage may occur by being distorted, deformed, pulled by an adjacent layer, or the like. In addition, breakage due to mixed impurities or breakage such as sticking of fibrous substances may occur.

An object of the present invention is to provide a battery or a membrane electrode assembly having high durability.

According to one aspect of the present invention, there is provided a battery (100) having a multilayer structure containing layers of a pair of electrodes (1), the battery (100) including a reinforcing material (20) provided in one or more layers or between layers.

According to one aspect of the present invention, there is provided a membrane electrode assembly (3) including an electrolyte membrane (2) between a pair of electrodes (1), wherein the electrodes (1) have a multilayer structure and include a reinforcing material (20) provided in one or more layers or between layers of each layer of the electrodes (1) and the electrolyte membrane (2).

According to the present invention, a battery or a membrane electrode assembly having high durability can be provided.

BRIEF DESCRIPTION OF THE DRAWINGS

FIG. 1 is a cross-sectional view showing a configuration of a polymer electrolyte fuel cell of the present embodiment.

FIG. 2 is a cross-sectional view showing an example of a broken portion in a polymer electrolyte fuel cell.

DETAILED DESCRIPTION

Hereinafter, embodiments of a battery and a membrane electrode assembly of the present invention will be described with reference to the drawings. The configuration described below is an example (representative example) as one embodiment of the present invention, and the present invention is not limited to the configuration described below.

The battery of the present invention is a chemical battery or a physical battery including a pair of electrodes, and has a multilayer structure in which a plurality of layers including the electrodes are laminated. Examples of the chemical battery include chemical batteries such as an alkali manganese battery, a nickel hydride battery, a lithium ion secondary battery, and a fuel cell, and examples of the physical battery include a solar cell and the like.

Hereinafter, a polymer electrolyte fuel cell (PEFC) will be described as an embodiment of the battery of the present invention. However, the present invention can be applied to any battery having a multilayer structure including a pair of electrodes as in the case of the PEFC.

(PEFC)

FIG. 1 shows a configuration of a PEFC 100 according to an embodiment of the present invention.

As shown in FIG. 1, the PEFC 100 includes a membrane electrode assembly (MEA) 3 and two separators 4 provided to both sides of the MEA 3.

(MEA)

The MEA 3 includes a pair of electrodes 1 and an electrolyte membrane 2 provided between the pair of electrodes 1.

(Electrode)

One electrode 1 of the pair is an anode and is also referred to as a fuel electrode. The other electrode 1 is a cathode and is also referred to as an air electrode. At the anode, a reaction occurs in which electrons ($e^-$) and protons ($H^+$) are generated from the hydrogen gas ($H_2$) supplied through the separator 4. The electrons move to the cathode via an external circuit. This movement of the electrons generates a current in the external circuit. The protons move to the cathode via the electrolyte membrane 2. At the cathode, oxygen gas ($O_2$) is supplied through the separator 3 and oxygen ions ($O_2^-$) are generated by electrons transferred from the external circuit. The oxygen ions combine with the protons ($2H^+$) transferred from the electrolyte membrane 2 to generate water ($H_2O$).

The electrode 1 includes at least a catalyst layer 11. The electrode 1 may have a multilayer structure, and may include, for example, a gas diffusion layer 12 and a porous layer 13 in order to improve gas diffusivity.

The catalyst layer 11 promotes the reaction of the hydrogen gas and the oxygen gas by the catalyst. The catalyst layer 11 includes a catalyst, a carrier supporting the catalyst, and an ionomer covering the catalyst and the carrier.

Examples of the catalyst include metals such as platinum (Pt), ruthenium (Ru), iridium (Ir), rhodium (Rh), palladium (Pd), and tungsten (W), and mixtures and alloys of these metals. Among them, platinum, a mixture containing platinum, an alloy containing platinum, and the like are preferable from the viewpoint of catalytic activity, poisoning resistance to carbon monoxide, heat resistance, and the like.

Examples of the carrier include conductive porous metal compounds having pores such as mesoporous carbon and Pt black. From the viewpoint of good dispersibility, large surface area, and small particle growth at high temperature even when the amount of the catalyst supported is large, mesoporous carbon is preferable.

As the ionomer, an ion-conductive polymer electrolyte similar to that of the electrolyte membrane 2 described later can be used.

The gas diffusion layer 12 can uniformly diffuse the gas supplied through the separator 4 into the catalyst layer 11. As the gas diffusion layer 12, for example, a porous fiber sheet having conductivity, gas permeability, and gas diffusivity such as carbon fiber; a metal plate such as foamed metal or expanded metal; or the like can be used.

The porous layer 13 is provided as an intermediate layer between the catalyst layer 11 and the gas diffusion layer 12, and can reduce the electric resistance of the electrode 1 and improve the gas flow. In addition, the porous layer 13 can promote the discharge of water generated in the electrolyte membrane 2 and suppress the reverse diffusion. Examples of the porous layer 13 include a porous sheet in which conductive carbon and a water-repellent binder resin are mixed. From the viewpoint of water-transporting property, a porous body having an average pore diameter of 1 to 10 nm is preferable. As the carbon, for example, graphite, carbon black, graphene, carbon nanotube, carbon fiber, or the like can be used.

(Electrolyte Membrane)

The electrolyte membrane 2 is an ion-conductive polymer electrolyte membrane. Examples of the electrolyte membrane 2 include perfluorosulfonic acid polymers such as Nafion (registered trademark) and Aquivion (registered trademark); aromatic polymers such as sulfonated polyether ether ketone (SPEEK) and sulfonated polyimide; and aliphatic polymers such as polyvinyl sulfonic acid and polyvinyl phosphoric acid.

From the viewpoint of improving durability, the electrolyte membrane 2 may be a composite membrane obtained by impregnating a porous substrate 2a with a polymer electrolyte. The porous substrate 2a is not particularly limited as long as it can support a polymer electrolyte, and a porous, woven, non-woven, or fibril membrane can be used. The material of the porous substrate 2a also is not particularly limited, and the above-described polymer electrolytes can be used from the viewpoint of enhancing ion conductivity. Among them, polytetrafluoroethylene, polytetrafluoroethylene-chlorotrifluoroethylene copolymer, polychlorotrifluoroethylene and the like, which are fluorine-based polymers, are excellent in strength and shape stability.

(Separator)

The separator 4 is a plate to which a rib 4b forming a gas flow path 4a is provided, and is also called a bipolar plate. A metal is generally used as the material of the separator 4. For example, carbon or the like is used from the viewpoint of weight reduction, and stainless steel or the like is used from the viewpoint of thickness reduction.

(Reinforcing Material)

The PEFC 100 includes a reinforcing material 20 having excellent mechanical strength in one or more layers or between layers including the layer of the electrode 1.

When environmental conditions such as temperature, moisture, and pressure change and a cycle of heating and cooling, wetting and drying, pressurization and depressurization, and the like is repeated, a load such as distortion and deformation of each layer constituting the PEFC 100 and tensile force between the each layers may occur. Even when such a load is generated, the load can be relieved by the reinforcing material 20 to reduce breakage of each layer.

FIG. 2 shows an example of broken portions of the PEFC 100 by triangular markers P1 to P7.

When the above-described cycle of heating and cooling, wetting and drying, pressurization and depressurization, and the like is repeated, the catalyst layer 11, the gas diffusion layer 12, the porous layer 13, the electrolyte membrane 2, and the separator 4 constituting the electrode 1 are distorted or deformed, and breakage such as a crack may occur inside each layer indicated by the markers P1 to P5. In addition, due to a difference in physical properties such as a thermal expansion coefficient and tensile strength between each layer and an adjacent layer, each layer is pulled by the adjacent layer or the like, and thus breakage may occur inside each layer indicated by the markers P1 to P5.

In particular, the inside of the electrolyte membrane 2 is easily broken as indicated by the marker P1 by repeating a cycle of wet swelling during operation and dry shrinkage during stoppage. When the electrolyte membrane 2 is expanded, the electrolyte membrane 2 may be broken at a boundary position between the catalyst layer 11 and the electrolyte membrane 2 protruding from the catalyst layer 11, that is, a position indicated by the marker P7, due to a difference in characteristics between the electrolyte membrane 2 and the adjacent catalyst layer 11.

In addition, when an external impact is applied, a load is applied to a contact portion between the rib 4b on the surface of the separator 4 and the gas diffusion layer 12, particularly, a portion in contact with the corner of the rib 4b, and the gas diffusion layer 12 may be broken at a position indicated by the markers P5 and P6.

By appropriately using the reinforcing material 20 at the breakage points indicated by the markers P1 to P7, the breakage of each layer can be reduced. It should be noted that the positions indicated by the markers P1 to P7 in FIG. 2 are examples of breakage points, and are not limited thereto.

The reinforcing material 20 provided in each layer may be mixed with the components of each layer of the catalyst layer 11, the gas diffusion layer 12, and the porous layer 13 of the electrode 1, and the electrolyte membrane 2 to form each layer, or may be impregnated in each layer. For example, the electrolyte membrane 2 may be formed by mixing a polymer electrolyte and the reinforcing material 20 to form a membrane. In addition, the porous substrate 2a of the electrolyte membrane may be composed of the reinforcing material 20, or the substrate 2a may be impregnated with the reinforcing material 20. Alternatively, the catalyst layer 11, the gas diffusion layer 12, or the porous layer 13 may be immersed in a liquid bath of the reinforcing material 20 to impregnate the reinforcing material 20 into the porous material of each layer.

The reinforcing material 20 provided between the each layers may be a sheet material having a void or may be a coating film covering the surface of each layer. Such a reinforcing material 20 can prevent a decrease in conductivity. The shape of the sheet material having a void is not particularly limited, and examples thereof include a porous shape, a net shape, a woven fabric shape, a non-woven fabric shape, and a fibril shape. The sheet material may be stuck to each layer using an adhesive. The coating film of the reinforcing material 20 can be provided by, for example, impregnating or coating the surface of at least one of the layers on both sides with the reinforcing material 20. The coating film is thin, and for example, when the coated layer is porous, the porous shape can be maintained without change.

The mechanical strength of the reinforcing material can be increased by designing a polymer having high structural regularity. For example, the mechanical strength of the reinforcing material 20 can be increased by designing the reinforcing material so as to increase the crystallinity, such as an increase in the cis-configuration, a sharpening in the molecular weight distribution of the polymer chain, an increase in the regularly folded structure, and an elongation of the polymer chain.

The reinforcing material 20 may or may not have ion conductivity, but the reinforcing material 20 having ion conductivity can be used, for example, as part or all of the ionomer of the catalyst layer 11 or the polymer electrolyte of the electrolyte membrane 2. Further, the reinforcing material 20 having ion conductivity can be provided with hydrophilicity. Therefore, from the viewpoint of imparting an ion exchange function or from the viewpoint of imparting hydrophilicity to enhance the water discharge property or wettability of the layer in which the reinforcing material 20 is present, the reinforcing material 20 preferably has an ion exchange group and has ion conductivity.

The reinforcing material 20 may be provided in a layer or between layers on either one side of the anode side and the cathode side, or may be provided in layers or between layers on both sides, but the reinforcing material 20 provided to the anode side preferably has an ion exchange group and has ion conductivity. On the anode side, the ion conductivity tends to decrease due to dry-out, but the ion conductivity of each layer can be supplemented by the reinforcing material 20.

In the PEFC 100 of the present embodiment, the reinforcing material 20, which is a net-shaped sheet material, is provided both between the gas diffusion layer 12 and the separator 4 on the anode side and between the gas diffusion layer 12 and the separator 4 on the cathode side. In addition, the reinforcing material 20 having ion conductivity is impregnated in the porous layer 13 on the anode side.

The ion conductivity of the reinforcing material 20 may have a gradient depending on the positional relationship between the electrolyte membrane 2 and the reinforcing material 20. For example, the ion conductivity of the reinforcing material 20 is preferably higher as the position of the reinforcing material 20 is closer to the electrolyte membrane 2. As the ion conductivity of the reinforcing material 20 is higher, protons generated in the anode are more likely to move to the cathode, and the power generation efficiency is more likely to increase.

The ion conductivity of the reinforcing material 20 can be measured from a membrane formed of the reinforcing material 20 in accordance with JIS R 1661:2004.

Specific examples of the reinforcing material 20 having ion conductivity include a high cis-diene polymer having a cis-1,4 bond content of 85% or more and having an ion exchange group, a stretched polytetrafluoroethylene (PTFE) membrane described in WO 2010/044436, a polyurea electrolyte described in JP 2011-21176 A, and the like, but are not limited thereto as long as the material has excellent mechanical strength. One of these may be used alone or two or more of these may be used in combination as the reinforcing material 20. A commercially available product can also be used as the reinforcing material 20. Examples of the commercially available product include PrimoSpire (registered trademark) (self-reinforced polyphenylene, Solvay) and Kapton (registered trademark) (heat-resistant and cold-resistant polyimide film, DuPont).

<High Cis-Diene Polymer>

Among the high cis-diene polymers, a high cis-diene polymer having a cis-1,4 bond content of 85% or more is preferable because it has high tensile strength and excellent durability. In general, the diene polymer has a cis-1,4 bond, a trans-1,4 bond, and a trans-1,2 bond between monomer units. In the high cis-diene polymer used in the present invention, the cis-1,4 bond content is preferably 90% or more, more preferably 95% or more, still more preferably 97% or more, and particularly preferably 99% or more, from the viewpoint of enhancing the elongation crystallinity and the mechanical strength.

The cis-1,4 bond content can be measured by Fourier transform infrared spectroscopy (FT-IR).

The molecular weight of the high cis-diene polymer is not particularly limited, but is preferably 1,000 or more, more preferably 10,000 or more, and particularly preferably 100,000 or more, in terms of polystyrene-equivalent number average molecular weight when used as a polymer electrolyte membrane. When the molecular weight is equal to or greater than the lower limit, sufficient mechanical strength is easily obtained. In the case of use as a polymer electrolyte in a catalyst layer for a fuel cell, the molecular weight is preferably 5,000,000 or less, more preferably 1,000,000 or less, and particularly preferably 500,000 or less. When the molecular weight is equal to or less than the upper limit, sufficient oxygen permeability and ion conductivity are easily obtained, and solubility during preparation of the ink for a catalyst layer is also easily obtained. The number average molecular weight can be calculated by gel permeation chromatography (GPC).

Since the electrolyte membrane 2 containing the high cis-diene polymer has excellent mechanical durability, it can withstand long-term continuous use even when the membrane thickness is reduced. Therefore, the high cis-diene polymer can be suitably used for PEFC applications even when the ion exchange capacity (IEC) is relatively small compared to the conventional polymer electrolyte.

The IEC of the high cis-diene polymer is preferably 0.1 meq/g or more, more preferably 0.5 meq/g or more, and still more preferably 1.0 meq/g or more, from the viewpoint of improving ion conductivity. In addition, the IEC of the high cis-diene polymer is preferably 3 meq/g or less, more preferably 2.5 meq/g or less, and still more preferably 2 meq/g or less, from the viewpoint of dimensional stability during water absorption. Therefore, the IEC of the high cis-diene polymer is preferably 0.1 to 3 meq/g, more preferably 0.5 to 2.5 meq/g, and still more preferably 1.0 to 2 meq/g.

The high cis-diene polymer having a cis-1,4 bond content of 85% or more and having an ion exchange group is a copolymer containing a high cis-diene polymer component and a polymer component having an ion exchange group.

Examples of the copolymer of the high cis-diene polymer component and the polymer component having an ion exchange group include a graft copolymer, a statistical copolymer, a block copolymer, and a combination thereof. Examples of the block copolymer include a diblock copolymer, a triblock copolymer, and a multiblock copolymer.

The ratio of the content of the polymer component having an ion exchange group to the content of the high cis-diene polymer component [(content of high cis-diene polymer component)/(content of polymer component having an ion exchange group)] may be any ratio within the above-described IEC range. That is, the ratio may be appropriately adjusted within the above-described IEC range depending on the purpose. For example, from the viewpoint of further increasing the mechanical strength, the ratio of the high cis-diene polymer component may be increased, and from the viewpoint of improving the ion conductivity, the ratio of the polymer component having an ion exchange group may be increased.

<High Cis-Diene Polymer Component>

Since the high cis-diene polymer component is subjected to elongation crystallization, excellent mechanical strength such as tensile strength and abrasion resistance is imparted to the reinforcing material 20.

The high cis-diene polymer component is preferably a conjugated diene having 4 to 12 carbon atoms from the viewpoint of improving mechanical strength. Examples of the conjugated diene having 4 to 12 carbon atoms include 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. These may be used alone or in combination of two or more kinds thereof. Of these, 1,3-butadiene and 2-methyl-1,3-butadiene are preferable, and 1,3-butadiene is more preferable.

The high cis-diene polymer component may include other components capable of forming a copolymer with a conjugated diene in addition to the conjugated diene. From the viewpoint of improving the heat resistance and increasing the degree of freedom of design as an elastomer by reducing the proportion of double bonds in the main chain of the copolymer and lowering the crystallinity, it is preferable to include a non-conjugated olefin as the other component. The non-conjugated olefin is preferably a non-cyclic olefin having 2 to carbon atoms. Preferable examples of the non-conjugated olefin include α-olefins such as ethylene, propylene, 1-butene, 1-pentene, 1-hexene, 1-heptene, and 1-octene. Since the α-olefin has a double bond at the α-position of the olefin, copolymerization with the conjugated diene can be efficiently carried out. Among the α-olefins, ethylene, propylene, or 1-butene is more preferable, and ethylene is still more preferable. These non-conjugated olefins may be used alone or in combination of two or more kinds thereof.

Examples of other components capable of forming a copolymer with a conjugated diene other than the above-mentioned non-conjugated olefins include aromatic vinyls such as styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene, and vinylnaphthalene; cyclic olefins such as cyclopentene, dicyclopentadiene, 2-norbornene, and 5-ethylidene-2-norbornene; non-conjugated dienes such as 1,5-hexadiene, 1,6-heptadiene, and 1,7-octadiene; methyl (meth)acrylate; (meth)acrylonitrile; and (meth)acrylamide.

Examples of the high cis-diene polymer component obtained as a result of the polymerization include a butadiene polymer and a butadiene-ethylene copolymer.

<Polymer Component Having Ion Exchange Group>

The polymer component having an ion exchange group imparts ion conductivity to the reinforcing material 20.

The ion exchange group is not particularly limited, and may be an anionic group or a cationic group.

Examples of the anionic group include a sulfonic acid group, a phosphoric acid group, a carboxylic acid group, a boronic acid group, and a sulfonylimide group. Among these, a sulfonic acid group is preferable because of its excellent ion conductivity. The counter cation is not particularly limited, but is preferably a monovalent cation such as an alkali metal ion, H+, or a quaternary ammonium ion.

Examples of the cationic group include an amino group such as an unsubstituted amino group, an N-alkylamino group, and an N-dialkylamino group; a nitrogen-containing heterocyclic ring such as a pyridyl group and an imidazolyl group; and a quaternary ammonium group such as an N-trialkylammonium group, an N-alkylpyridinium group, an N-alkylimidazolium group, a thiouronium group, and an isothiouronium group. The counter anion of the quaternary ammonium group is not particularly limited, but is preferably a halide anion of a Group 5B element such as $PF_6^-$, $SbF_6^-$, and $AsF_6^-$; a halide anion of a Group 3B element such as $BF_4^-$; a halogen anion such as $I^-(I_3^-, Br^-, $ and $Cl^-$; a halogenate anion such as $ClO_4^-$; a metalhalide anion such as $AlCl_4^-$, $FeCl_4^-$, and $SnCl_5^-$; a nitrate anion represented by $NO_3^-$; an organic sulfonate anion such as a p-toluenesulfonate anion, a naphthalenesulfonate anion, $CH_3SO_3^-$, and $CF_3SO_3^-$; a carboxylate anion such as $CF_3COO^-$ and $C_6H_5COO^-$; or a monovalent anion such as $OH^-$.

The polymer component into which an ion exchange group is introduced is not particularly limited as long as it is a compound into which an ion exchange group can be introduced and which can form a copolymer with the high cis-diene polymer component. Examples thereof include conjugated dienes such as 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene; olefins such as ethylene, propylene, 1-butene, 4-methyl-1-pentene, 1-hexene, 1-octene, and 1-decene; aromatic vinyls such as styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene, and vinylnaphthalene; cyclic olefins such as cyclopentene, dicyclopentadiene, 2-norbornene, and 5-ethylidene-2-norbornene; non-conjugated dienes such as 1,5-hexadiene, 1,6-heptadiene, and 1,7-octadiene; methyl (meth)acrylate; (meth)acrylonitrile; and (meth)acrylamide.

Exemplary compounds (1) to (4) of the polymer component having an ion exchange group are shown below, but the present invention is not limited thereto.

[Chemical Formula 1]

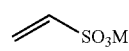

(1)

[In the formula, M is a hydrogen atom or an alkali metal atom.]

[Chemical Formula 2]

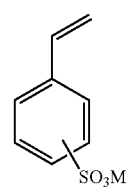

(2)

[In the formula, M is a hydrogen atom or an alkali metal atom.]

[Chemical Formula 3]

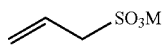
(3)

[In the formula, M is a hydrogen atom or an alkali metal atom.]

[Chemical Formula 4]

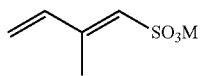
(4)

[In the formula, M is a hydrogen atom or an alkali metal atom.]

Examples of the polymer having an ion exchange group obtained as a result of polymerization include a fluorine-based polymer having an ion exchange group, an aliphatic polymer having an ion exchange group, and an aromatic polymer having an ion exchange group. In other words, the polymer component having an ion exchange group includes these polymers and monomers constituting the polymers.

Examples of the fluorine-based polymer having an ion exchange group include a perfluorosulfonic acid polymer. The perfluorosulfonic acid polymer has a polytetrafluoroethylene (PTFE) unit and a perfluorosulfonic acid unit. As the perfluorosulfonic acid polymer, a commercially available product can also be used. Examples of the commercially available product that can be used include Nafion (registered trademark, manufactured by DuPont), Aquivion (registered trademark, manufactured by Solvay), Flemion (registered trademark, manufactured by AGC Inc.), and Aciplex (registered trademark, manufactured by Asahi Kasei Corporation).

Exemplary compounds (5) to (7) of the perfluorosulfonic acid polymer are shown below, but the present invention is not limited thereto. Exemplary compounds (5) and (6) are Nafion (registered trademark) and Aquivion (registered trademark), respectively. Exemplary compound (7) is an ionomer proposed by 3M Company.

[Chemical Formula 5]

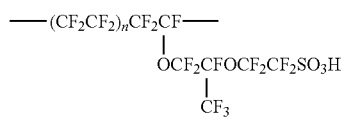
(5)

[In the formula, n is an integer of 1 or more.]

[Chemical Formula 6]

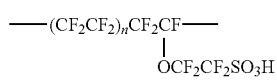
(6)

[In the formula, n is an integer of 1 or more.]

[Chemical Formula 7]

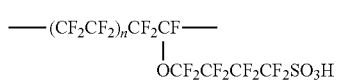
(7)

[In the formula, n is an integer of 1 or more.]

Examples of the aliphatic polymer having an ion exchange group include polyvinyl sulfonic acid and polyvinyl phosphoric acid.

Examples of the aromatic polymer having an ion exchange group include sulfonated polyetheretherketone (SPEEK), sulfonated polyethersulfone (SPES), sulfonated polyphenylsulfone (SPPSU), sulfonated polyimide, sulfonated polyetherimide, sulfonated polysulfone, and sulfonated polystyrene.

Exemplary compounds (8) to (10) of the aromatic polymer having an ion exchange group are shown below, but the present invention is not limited thereto.

Exemplary compound (8) is SPEEK, exemplary compound (9) is SPES, and exemplary compound (10) is sulfonated polyetherimide.

[Chemical Formula 8]

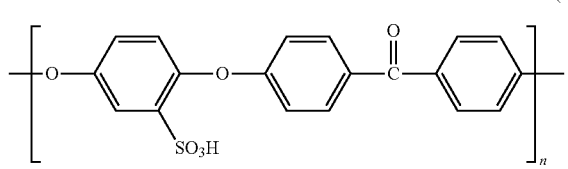
(8)

[In the formula, n is an integer of 1 or more.]

[Chemical Formula 9]

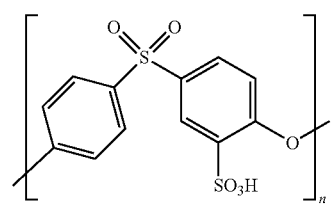
(9)

[In the formula, n is an integer of 1 or more.]

[Chemical Formula 10]

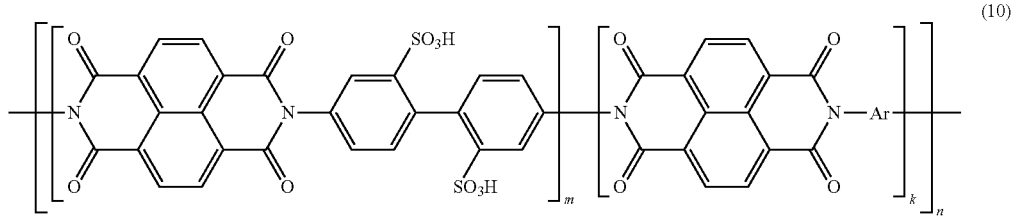

(10)

[In the formula, k, m and n are integers of 1 or more.]

<Method for Producing High Cis-Diene Polymer>

The above-described high cis-diene polymer can be produced by a conventionally known method. The high cis-diene polymer is usually obtained by polymerizing each component in the presence of a catalyst such as a Ziegler-Natta catalyst, a nickel-based catalyst, an aluminum-based catalyst, a lanthanide-based catalyst composition-based catalyst, or a metallocene complex-based catalyst. Among these catalysts, a lanthanide-based catalyst composition-based catalyst and a metallocene complex-based catalyst are preferably used.

The lanthanide-based catalyst composition-based catalyst is not particularly limited, and for example, a known lanthanide-based catalyst composition-based catalyst described in JP 2015-508843 A can be used.

The metallocene complex-based catalyst is not particularly limited, and for example, known metallocene complex-based catalysts described in JP 2012-162627 A and JP 2012-180457 A can be used. Among the metallocene complex-based catalysts, a gadolinium metallocene complex-based catalyst using gadolinium as a lanthanoid element is more preferable. Since the gadolinium metallocene complex-based catalyst has very high activity, a polymer electrolyte having a high cis-1,4 bond content can be obtained by using the catalyst. Further, since the catalyst has very high activity, the amount of the catalyst to be used can be greatly reduced.

In addition, even when a conjugated diene and a non-conjugated olefin are contained as the high cis-diene polymer component, a lanthanide-based catalyst composition-based catalyst and a metallocene complex-based catalyst are preferable, and the gadolinium metallocene complex-based catalyst described above is particularly preferable. By using the gadolinium metallocene complex-based catalyst, the conjugated diene-olefin copolymer can be efficiently synthesized.

As the polymerization method, any method such as a solution polymerization method, a suspension polymerization method, a liquid phase bulk polymerization method, an emulsion polymerization method, a gas phase polymerization method, and a solid phase polymerization method can be used. When a solvent is used in the polymerization reaction, the solvent to be used may be inert to the polymerization reaction, and examples thereof include aprotic polar solvents such as N,N-dimethylformamide, N,N-dimethylacetamide, N-methyl-2-pyrrolidone, and dimethyl sulfoxide; chlorinated solvents such as dichloromethane, chloroform, 1,2-dichloroethane, chlorobenzene, and dichlorobenzene; alcohols such as methanol, ethanol, and propanol; and alkylene glycol monoalkyl ethers such as ethylene glycol monomethyl ether, ethylene glycol monoethyl ether, propylene glycol monomethyl ether, and propylene glycol monoethyl ether. These solvents may be used alone or as a mixture of two or more kinds of solvents, if necessary.

By appropriately adjusting the addition method, heating conditions, and the like using the above-described method, a statistical copolymer, a graft copolymer, a block copolymer, and a copolymer such as a combination thereof can be produced. The high cis-diene polymer having a cis-1,4 bond content of 85% or more produced by the above-described method has high tensile strength and excellent mechanical durability.

The high cis-diene polymer may be a crosslinked product from the viewpoint of improving mechanical strength. Examples of the crosslinking method include use of a crosslinking agent and irradiation with energy rays such as electron beams and radiation. Examples of the crosslinking method using a crosslinking agent include a method in which a composition obtained by dissolving a high cis-diene polymer and a crosslinking agent in a solvent is crosslinked by heating or irradiation with light. The crosslinking agent is not particularly limited, and a known crosslinking agent can be used.

<Method for Producing MEA>

The MEA 3 can be produced, for example, as follows.

First, a polymer electrolyte is formed into a membrane to form an electrolyte membrane 2, or the polymer electrolyte is impregnated into a porous substrate 2a to obtain the electrolyte membrane 2. A catalyst layer ink containing a catalyst, a carrier and an ionomer is applied to both surfaces of the electrolyte membrane 2 to form catalyst layers 11. Next, the porous layer 13 impregnated with the reinforcing material 20 by immersion in a liquid bath of the reinforcing material 20 is stuck to the anode side catalyst layer, and the porous layer 13 not impregnated with the reinforcing material 20 is stuck to the cathode side catalyst layer. A gas diffusion layer 12 is further stuck to the porous layer 13 to obtain the MEA 3.

<Method for Producing PEFC>

The PEFC 100 can be produced, for example, as follows.

The reinforcing material 20, which is a net-shaped sheet material, is stuck to the MEA 3 of the gas diffusion layer produced as described above. Further, the separator 4 is stuck to the net-shaped sheet material of the reinforcing material 20 to obtain a PEFC 100.

Examples

Hereinafter, the present invention will be described with reference to Examples, but the present invention is not limited to these Examples.

By the above-described method, a high cis-diene polymer having a cis-1,4 bond content of 85% was obtained. A net-shaped sheet material was formed by using the high cis-diene polymer, and the sheet material was stuck onto a gas diffusion layer of a PEFC having the same configuration as that of PEFC 100 shown in FIG. 1 to provide a reinforcing material between the gas diffusion layer and a separator.

A thermal test in which the PEFC provided with the reinforcing material and the PEFC not provided with the reinforcing material were held in a humidity chamber at −30° C. for 1 hour and then at 100° C. for 1 hour was repeated. When the presence or absence of breakage of each layer of the PEFC was visually confirmed every 5 cycles of the thermal test, breakage was observed earlier in the PEFC not provided with the reinforcing material than in the PEFC provided with the reinforcing material, and it was found that the durability of the PEFC provided with the reinforcing material was high.

In addition, when the same test was performed using a high cis-diene polymer having a cis-1,4 bond content of 95%, it was found that the number of cycles until breakage was confirmed was larger than that of the high cis-diene polymer having a cis-1,4 bond content of 85%, and the durability was higher.

Although the preferred embodiments of the present invention have been described above, the present invention is not limited to these embodiments, and various modifications and changes can be made within the scope of the present invention.

For example, not only the PEFC 100 described above, but also lithium ion batteries, solar batteries, and the like are batteries having a multilayer structure including layers of a pair of electrodes. Even in batteries other than PEFC 100, according to the present invention, by providing the reinforcing material 20 in each layer or between layers, the durability of the entire batteries, which are laminates, can be increased.

REFERENCE SIGNS LIST

100: PEFC
1: Electrode
3: MEA
11: Catalyst layer
12: Gas diffusion layer
13: Porous layer
4: Separator
20: Reinforcing material

The invention claimed is:

1. A battery (100) having a multilayer structure comprising layers of a pair of electrodes (1), the battery (100) comprising a reinforcing material (20) provided in one or more layers or between layers, wherein the reinforcing material (20) contains a high cis-diene polymer, and a cis-1,4 bond content of the high cis-diene polymer is 85% or more.

2. The battery (100) according to claim 1, wherein the cis-1,4 bond content of the high cis-diene polymer is 95% or more.

3. The battery (100) according claim 1, wherein the reinforcing material (20) provided in one or more layers is mixed with a component of the layers to constitute the layers or is impregnated in the layers.

4. The battery (100) according to claim 1, wherein the reinforcing material (20) provided between layers is a sheet material having a void or a coating film covering a surface of at least one of the layers on both sides.

5. The battery (100) according to claim 1, wherein the battery (100) is a polymer electrolyte fuel cell and includes an electrolyte membrane (2) between the pair of electrodes (1) and separators (4) on both sides of the pair of electrodes (1), the electrode (1) includes a catalyst layer (11) and a gas diffusion layer (12), and the reinforcing material (20) is provided in one or more layers or between layers of the electrolyte membrane (2), the catalyst layer (11), and the gas diffusion layer (12).

6. The battery (100) according to claim 5, wherein the reinforcing material (20) has an ion exchange group.

7. The battery (100) according to claim 5, wherein the reinforcing material (20) provided in a layer or between layers of an electrode side which is an anode has an ion exchange group.

8. A membrane electrode assembly (3) comprising an electrolyte membrane (2) between a pair of electrodes (1), wherein the electrodes (1) have a multilayer structure and comprise a reinforcing material (20) provided in one or more layers or between layers of each layer of the electrodes (1) and the electrolyte membrane (2), wherein the reinforcing material (20) contains a high cis-diene polymer, and a cis-1,4 bond content of the high cis-diene polymer is 85% or more.

9. The membrane electrode assembly (3) according to claim 8, wherein the cis-1,4 bond content of the high cis-diene polymer is 90% or more.

10. A battery comprising:
an electrolyte membrane (2) including a porous substrate impregnated with reinforcing material;
a pair of electrodes (1) disposed on both sides of the electrolyte membrane (2), each of the electrodes (1) including a catalyst layer (11), a gas diffusion layer (12), and reinforcing material (20) is provided in one or more layers or between layers of the electrolyte membrane (2), the catalyst layer (11), and the gas diffusion layer (12); and
separators (4) on both sides of the pair of electrodes (1) wherein the reinforcing material (20) contains a high cis-diene polymer, and a cis-1,4 bond content of the high cis-diene polymer is 85% or more.

11. The battery according to claim 10, wherein the cis-1,4 bond content of the high cis-diene polymer is 90% or more.

12. The battery according to claim 10, wherein the cis-1,4 bond content of the high cis-diene polymer is 95% or more.

* * * * *